United States Patent
Pesin et al.

(10) Patent No.: US 11,889,146 B2
(45) Date of Patent: Jan. 30, 2024

(54) METHOD AND APPARATUS FOR SWITCHING FROM A FIRST TO A SECOND TRANSPORT STREAM OF SAME CONTENT

(71) Applicant: INTERDIGITAL MADISON PATENT HOLDINGS, SAS, Paris (FR)

(72) Inventors: Anthony Pesin, Chateaugiron (FR); Abdullah Haskou, Cesson-Sevigne (FR); Ali Louzir, Rennes (FR); Jean-Yves Le Naour, Pace (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 41 days.

(21) Appl. No.: 17/617,143

(22) PCT Filed: Jun. 4, 2020

(86) PCT No.: PCT/EP2020/065427
§ 371 (c)(1),
(2) Date: Dec. 7, 2021

(87) PCT Pub. No.: WO2020/249448
PCT Pub. Date: Dec. 17, 2020

(65) Prior Publication Data
US 2022/0256232 A1      Aug. 11, 2022

(30) Foreign Application Priority Data

Jun. 13, 2019 (EP) ..................... 19305755

(51) Int. Cl.
*H04N 21/438* (2011.01)
*H04N 21/426* (2011.01)

(52) U.S. Cl.
CPC ..... *H04N 21/4383* (2013.01); *H04N 21/4263* (2013.01)

(58) Field of Classification Search
CPC ....... H04N 21/23418; H04N 21/23439; H04N 21/4263; H04N 21/4383; H04N 21/4384; H04N 21/8456
See application file for complete search history.

(56) References Cited

U.S. PATENT DOCUMENTS

| | | |
|---|---|---|
| 8,385,486 B2 | 2/2013 | Soga et al. |
| 8,683,542 B1 | 3/2014 | Henry |

(Continued)

FOREIGN PATENT DOCUMENTS

| | | |
|---|---|---|
| JP | 2005094390 A | 4/2005 |
| JP | 2014165618 A | 9/2014 |

OTHER PUBLICATIONS

English Translation of JP2005094390 A, entitled: System and Method for Switching Digital Broadcast Signal, dated Nov. 15, 2021.

(Continued)

*Primary Examiner* — Rong Le
(74) *Attorney, Agent, or Firm* — Volpe Koenig (57) ABSTRACT

In situations where a receiver, rendering a content, switches from a first transport stream carrying that content to a second transport stream carrying that same content, artefacts may occur on the rendered content while transitioning between both transport streams. Considering transport stream data of a transport stream signal may be available at a nominal frequency higher than a frequency corresponding to the transport stream bitrate, there may be some periods of time during which no data is present in the transport stream signal. A salient idea is to switch from the first transport stream signal to the second transport stream signal in such periods during which there is no transport stream valid data (Continued)

in the first transport stream signal, allowing to minimize the risks of perceptible defects in the rendered content throughout the switching.

15 Claims, 3 Drawing Sheets

(56) References Cited

U.S. PATENT DOCUMENTS

| | | |
|---|---|---|
| 8,804,866 B2 | 8/2014 | Yamamoto et al. |
| 2005/0163261 A1 | 7/2005 | Nakao et al. |
| 2006/0194562 A1* | 8/2006 | Marrah .................. H04H 40/90 |
| | | 455/334 |
| 2009/0323872 A1 | 12/2009 | Haller |
| 2014/0002729 A1* | 1/2014 | Ooishi ............... H04N 21/4425 |
| | | 348/441 |
| 2015/0049757 A1* | 2/2015 | Hammer ............ H04N 21/6405 |
| | | 370/352 |
| 2015/0113571 A1 | 4/2015 | Cholas et al. |
| 2017/0318353 A1* | 11/2017 | Petruzzelli ............. H01Q 21/28 |
| 2018/0020036 A1 | 1/2018 | Ramamurthy et al. |

OTHER PUBLICATIONS

English Translation of JP2014165618 A, entitled: Video Stream Switching System, Video Stream Switching Method 2 and Program, dated Nov. 15, 2021.

* cited by examiner

METHOD AND APPARATUS FOR SWITCHING FROM A FIRST TO A SECOND TRANSPORT STREAM OF SAME CONTENT

CROSS REFERENCE TO RELATED APPLICATIONS

This application is a U.S. National Stage Application under 35 U.S.C. 371 of International Patent Application No. PCT/EP2020/065427, filed Jun. 4, 2020, which is incorporated herein by reference in its entirety.

This application claims the benefit of European Application No. 19305755, filed Jun. 13, 2019, which is incorporated herein by reference in its entirety.

1. TECHNICAL FIELD

The present disclosure relates to the distribution of audio video services and more particularly to the reception of such services when they are delivered via transport streams.

2. BACKGROUND ART

A transport stream is an audio video and data communications transmission protocol specified by the Moving Picture Experts Group MPEG-2 part 1. A transport stream allows multiplexing of digital video and audio, meaning that the data is combined into a single bit stream for transmission over a variety of networks such as broadcast (e.g., satellite, cable, terrestrial) or broadband networks.

Generally multiple transport streams carrying multiple audio video services are available to receivers. For rendering a content, a receiver may select a first transport stream carrying that content for decoding that content. The receiver may then switch to a second transport stream carrying a further content for decoding that further content. When switching from the first transport stream to the second transport stream for transitioning from the (initial) content to the further content, artefacts may occur on the rendered content, for example, due to resynchronizations of various receiving stages of the receiver. When the further content is different from the initial content, rendering artefacts are generally acceptable because they are related to the content change. In situations where a receiver, rendering a content, switches from a first transport stream carrying that content to a second transport stream carrying that same content, artefacts may occur on the rendered content while transitioning between both transport streams. Since the same content is rendered throughout the transport stream switching, perceptible artefacts are more likely to be disturbing for a user.

The present disclosure has been devised with the foregoing in mind.

3. SUMMARY

According to a first aspect, there is provided a method for switching from a first transport stream signal to a second transport stream signal, the first and the second transport stream signals comprising a same content. The method comprises switching from the first transport stream signal to the second transport stream signal if the second transport stream signal has a higher quality metric than the first transport stream signal, wherein the switching is performed when there is no valid data in the first transport stream signal.

According to a second aspect, there is provided an apparatus comprising:
receiving means for receiving a first and a second transport stream signals comprising a same content;
switching means for switching from the first transport stream signal to the second transport stream signal if the second transport stream signal has a higher quality metric than the first transport stream signal, wherein the switching means are configured to switch when there is no valid data in the first transport stream signal.

It should be understood that the drawing(s) are for purposes of illustrating the concepts of the disclosure and are not necessarily the only possible configuration for illustrating the disclosure.

5. DESCRIPTION OF EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the term "interconnected" is defined to mean directly connected to or indirectly connected with through one or more intermediate components. Such intermediate components may include both hardware and software based components. The term "interconnected" is not limited to a wired interconnection and also includes wireless interconnection.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function orb) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

In addition, it is to be understood that the figures and descriptions of the present disclosure have been simplified to illustrate elements that are relevant for a clear understanding of the present disclosure, while eliminating, for purposes of clarity, many other elements found in typical digital multimedia content delivery methods, devices and systems. However, because such elements are well known in the art, a detailed discussion of such elements is not provided herein. The disclosure herein is directed to all such variations and modifications known to those skilled in the art.

The present disclosure is depicted with regard to a plurality of transport streams comprising a same content and being available to a receiver.

By "content" it is meant herein any content that may be transported over a transport stream. A content may for example be any content comprising audio and/or video and/or data. By "receiver" it is meant herein an apparatus such as a processing device, capable of receiving a transport stream, decoding and rendering any content carried in the transport stream. By "tuner" it is meant herein a radio frequency circuitry capable of isolating a particular radio frequency band, converting the radio frequency signal of the isolated band into a digital baseband signal, and of demodulating the baseband signal into a transport stream signal as defined by MPEG-2 part-1. By "transport stream signal", it is meant herein any kind (e.g., format) of digital signal by which transport stream data may be represented and/or exchanged (e.g., transmitted) between, for example, different integrated circuits of a receiver.

There may be various situations where a receiver rendering a content may switch from a first transport stream signal comprising that content to a second transport stream signal comprising the same content without interrupting the content rendering. In a first exemplary situation, a receiver may implement a multi-antenna spatial diversity application to monitor the signal quality received from the various antennas. Monitoring the signal reception quality of different antennas may allow to detect a signal degradation occurring while using an antenna and to identify another antenna capable of providing a better receiving performance. For example, such monitoring may allow to determine whether any antenna may offer a higher signal reception quality than a currently used antenna to prevent a degradation to be perceptible on the rendered content. The receiver may, for example, use a first antenna for receiving and rendering (e.g., a bitstream, set of transport stream packets carrying) a content and use the other antennas to monitor the signal reception quality available via the other antennas for receiving the same (e.g., bitstream, set of transport stream packets carrying the same) content. In the first exemplary situation, the content received for rendering via the first antenna and, received for monitoring via the other antennas may be a same bitstream (e.g., a same set of transport stream packets) of content. In case the receiver detects the (e.g., bitstream of the) content may be received via another antenna with a higher signal quality, the receiver may decide to switch to the second antenna for receiving the same (e.g., bitstream of the same) content via the second antenna.

In a second exemplary situation, the same content may be a same audio/video service but at different (e.g., encoding) quality levels. A same content may be available, for example, as different bitstreams of a same audio/video service. A video may for example be encoded at different resolutions and/or different quality levels, resulting in different bitstreams of different bitrates. An audio may also be sampled at different sampling rates and/or encoded with different quality levels resulting in different bitstreams of different bitrates. The different bitstreams of different bitrates may further be transmitted with different error protection mechanisms and/or in different radio frequency channels. The receiver, rendering a first bitstream of a content received from a first transport stream signal may detect or anticipate a degradation of the transmission performance (e.g., some packet loss) and decide to switch to a second transport stream signal (e.g. received with a better signal quality) for rendering a second bitstream of the same content, despite the second bitstream corresponding to a different quality level (e.g., resolution) of the same content.

In any of the above exemplary situations, since the receiver is rendering a same content throughout the switch between the two transport stream signals, it is desirable to minimize the artefacts on the rendered content so as to provide seamless switching. By artefacts it is meant herein any user perceptible defect on the rendered content. An artefact may for example be a visible video defect such as a macroblock, a blurred area, a black screen, a picture freeze on a displayed video. An artefact may also be a perceptible audio defect such as an audio glitch.

Different techniques may be possible for providing seamless switching between different transport streams carrying a same content. A receiver may for example duplicate the complete receiver processing chain, wherein a receiver processing chain may comprise at least a tuner, a demultiplexer, a clock recovery/synchronization, and audio/video decoders. Duplicating the complete receiver processing chain may allow to switch from a first bitstream to a second bitstream after both bitstreams having been resynchronized so as to minimize data loss and possible artefacts.

Another technique may be to duplicate (e.g., only) the tuners in a receiver, (e.g., not the rest of the receiver processing chain) and to determine the appropriate time at which the switching between a first and a second transport stream signals may be performed to reduce errors and perceptible artefacts (e.g., distortions). Determination of the appropriate time may not be straightforward because different transport stream signals received by different tuners of a same receiver may not be synchronized. This may be due to the independency of the different tuner paths of a receiver (e.g., the time for a signal to go through a tuner is not the same for all the tuners). Moreover, the path of a tuner may vary over time. If the tuner is, for example, coupled to a multi-port antenna the selection of the antenna port may impact the path of the tuner.

Transport stream data of a transport stream signal may be available at a nominal frequency higher than a frequency corresponding to the transport stream bitrate so that there may be some periods of time during which no data may be present in the transport stream signal. Switching from the first transport stream signal to the second transport stream signal during such periods wherein there is no transport stream data in the first transport stream signal, may allow to minimize the risks of perceptible defects in the rendered content.

Figure 1:
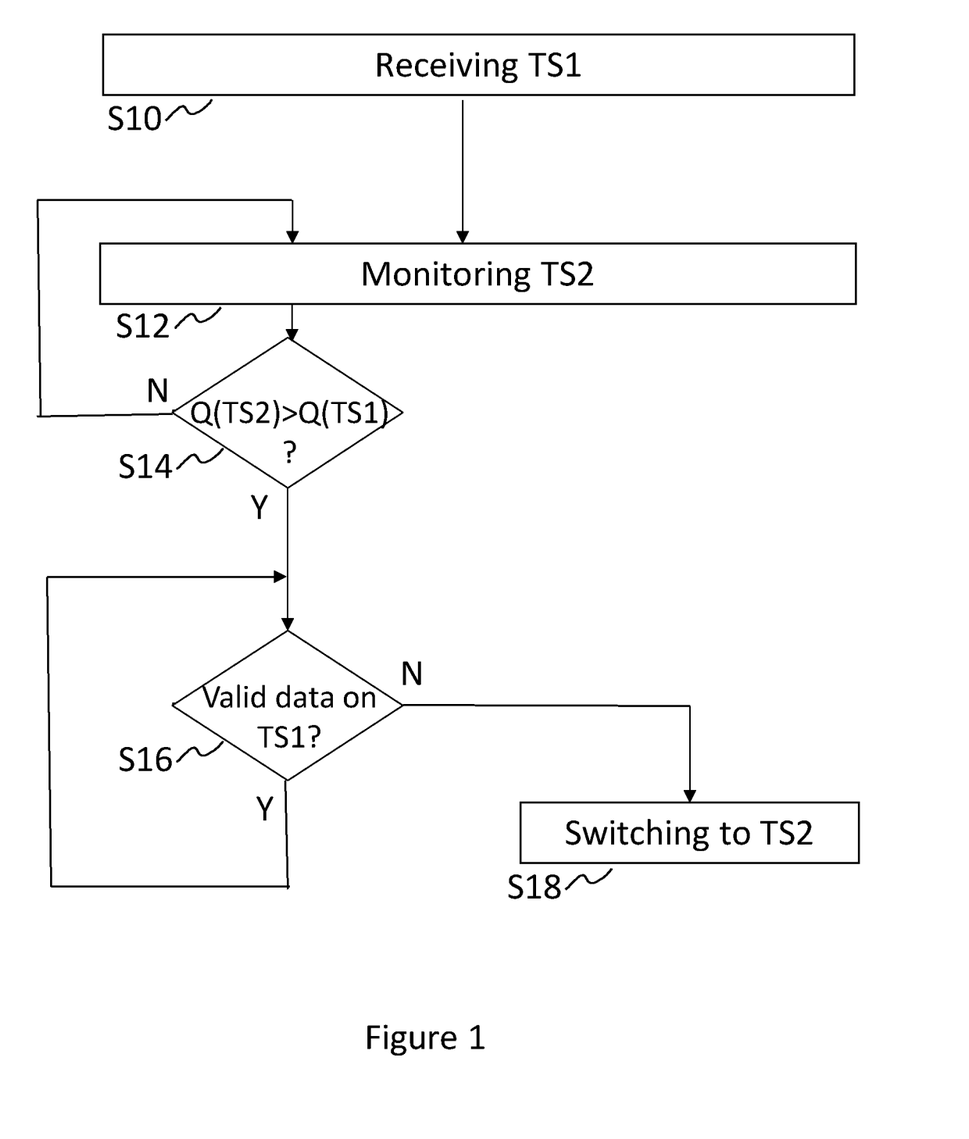
FIG. 1 is flow chart of an exemplary method for switching from a first transport stream signal to a second transport stream signal carrying a same content according to an embodiment.

FIG. 1 is a flow chart of an example of a method for switching from a first transport stream signal to a second transport stream signal comprising a same content. In a step S10, the first transport stream signal including the content may be received by a receiver, and the content may be rendered by the receiver. Receiving the first transport stream signal may comprise using a first tuner to tune to a radio frequency band for isolating and converting the radio frequency band into a baseband signal, to demodulate the baseband signal into a first transport stream signal. The first transport stream signal may be demultiplexed to extract the (e.g., bitstream, set of transport stream packets carrying the) content, which may then be decoded and rendered by the receiver or any kind of rendering device coupled to the receiver.

In a step S12, a second transport stream signal including the same (e.g., bitstream, set of transport stream packets carrying the same) content may be monitored by the receiver. Monitoring the second transport stream signal may comprise using a second tuner to tune to the same or another radio frequency band for isolating and converting the radio frequency band into a baseband signal, to demodulate the baseband signal into the second transport stream signal, including the same content as the first transport stream signal. The first and the second transport streams may be received from a same or different radio frequency channels. The first and the second transport streams may be received from a same or different antenna. The first and the second transport streams may include a same bitstream (e.g. same set of transport stream packets) of a same audio/video service or different bitstreams (e.g. different sets of transport stream packets) at different bitrates of a same audio/video service.

In a step S14, a first quality metric may be obtained for the first transport stream signal and a second quality metric may be obtained for the second transport stream signal. The first quality metric may be evaluated against the second quality metric to determine whether the first transport stream signal may be switched to the second transport stream signal for an (e.g., improved) rendering of the same content. The first and the second quality metric may be any kind of metric able to evaluate (e.g., compare, rank) a signal reception quality against another signal reception quality. For example, the (first/second) quality metric may be a signal to noise ratio (SNR) of the (first/second) transport stream signal. In another example, the (first/second) quality metric may be a receive signal strength indicator (RSSI) of the (first/second) transport stream signal. In yet another example, the (first/second) quality metric may be a bit error rate (BER) of the (first/second) transport stream signal. In yet another example, the (first/second) quality metric may be a packet error rate (PER) of the (first/second) transport stream signal. In yet another example, the (first/second) quality metric may be a modulation error rate (MER) of the (first/second) transport stream signal. In yet another example the (first/second) quality metric may be any (possibly weighted) combination of a SNR and/or a RSSI and/or a BER and/or a PER and/or a MER of the (first/second) transport stream signal. More generally any metric of a signal capable of determining whether one received signal is of better reception quality than another received signal is compatible with the enclosed embodiments.

If the second quality metric is higher (for example by a given value) than the first quality metric, it may be determined that the first transport stream signal may be switched to the second transport stream signal for rendering the same content with an improved (or not degraded) quality. In a step S16, it may further be determined whether there is any valid data in the first transport stream signal. If there is a current valid data in the first transport stream signal, the switch may be postponed to the point in time where there is no valid data in the first transport stream signal, and the method may loop to the step S16 (e.g. may further check whether there is any valid data in the first transport stream signal). When it is detected in the step S16, there is no more valid data in the first transport stream signal the receiver may switch to the second transport stream signal in a step S18 at a point in time when there is no valid data in the first transport stream signal. The switching may occur at any point in time of a period in which there is no valid data in the first transport stream signal. After the receiver has switched to the second transport stream signal, the various stages of the receiver chain (e.g., demultiplexer, resynchronization, decoding rendering) may then process the second transport stream signal instead of the first transport stream signal for rendering the same content.

If, at step S14 it is determined that the second quality metric is lower or similar (or not higher by a given value) than the first quality metric, the receiver may keep monitoring the first and the second transport stream signals and remain processing the first transport stream signal for rendering the content of the first transport stream signal.

For the sake of clarity, the method has been described with only two transport stream signals, but the method may also be applicable to more than two transport stream signals and more than two (e.g., signal reception) quality metrics. In a general case, a set of any number of transport stream signals may be monitored by a receiver, and the receiver (rendering a content of a first transport stream signal) may switch to any transport stream signal of the set transport stream signals, including the same (e.g., bitstream carrying the same) content if that transport stream signal has a higher (e.g. signal reception) quality metric than the first transport stream signal.

Figure 2:
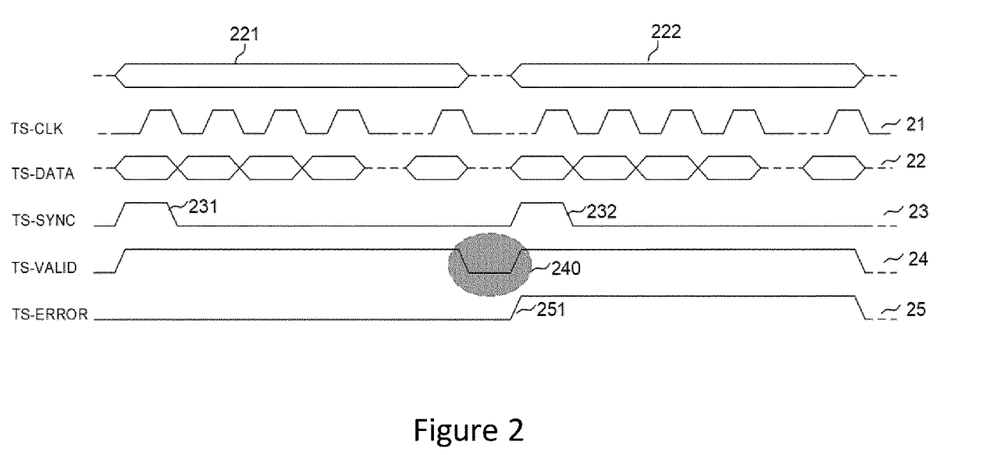
FIG. 2 illustrates an example of a transport stream interface according to an embodiment.

FIG. 2 illustrates an example of a transport stream signal. The illustrated transport stream signal comprises five (e.g., sub) signals 21, 22, 23, 24, 25 having either a high or a low value. A first sub-signal 21, which may be referred to herein as TS-CLK may represent the nominal frequency of the signal. A second sub-signal 22, which may be referred to herein as TS-DATA may represent the data (e.g., values) of the transport stream signal. For example, TS-DATA may be any of a single sub-signal serializing the data values, and a set of (e.g., eight, sixteen, thirty-two, . . . ) parallel sub signals representing the data values. MPEG2-part 1 defines a Transport Stream (TS) packet of 188 bytes, comprising synchronizing information. A third sub-signal 23, which may be referred to herein as TS-SYNC may indicate whether TS packets 221, 222 may be present in the transport stream signal (because for example dedicated fields of TS packets 221, 222 may be present at recurring occurrences). TS-SYNC 23 at a high level 231, 232 may indicate the beginning of a TS packet 221, 222. A fourth sub-signal 24, which may be referred to herein as TS-VALID may indicate whether there may be a valid data (e.g., when set to a high value) on the TS-DATA sub signal 22 or not (e.g., when set to a low value). As the nominal frequency (TS-CLK) may be higher than the bit rate of the transport stream signal, there may be "holes" in the time domain (e.g. time periods during which there may be no TS packet available in the transport stream signal). These time periods may be detected, for example, by the monitoring the TS-VALID sub-signal: a TS-VALID sub-signal 24 at a low level 240 may indicate there is no valid data in the transport stream signal. Switching the first transport stream signal to the second transport stream signal when the TS-VALID sub-signal 24 is at a low level 240 for the first transport stream signal may allow to avoid errors in the receiver processing chain while switching to the second transport stream signal. A fifth sub-signal 25, which may be referred to herein as TS-ERROR, when set to high level may indicate a TS packet 222 may be corrupted. The example of FIG. 2 illustrates a case where a corrupted TS packet follows a correct (non-corrupted) TS packet after a time period 240 with no valid data. Although not illustrated in FIG. 2, the disclosure is equally applicable to two correctly received (non-corrupted) TS packets, separated by a time period with no valid data (e.g. consecutive TS packets).

The disclosure is not limited to the transport stream signal format illustrated in FIG. 2 and is applicable to any kind of transport stream signal format.

According to an embodiment, the method may be applicable to a multi antenna spatial diversity application in a receiver comprising multiple tuners but (e.g., using) a single complete receiver processing chain. According to the embodiment, each tuner may be connected to a different antenna. A first transport stream signal may be received from a first antenna, and a content of the first transport stream signal may be processed by the single receiver processing chain for being rendered by the receiver (or a renderer coupled to the receiver). A second transport stream signal may be received from a second tuner coupled to a second antenna but not further processed by the rest of the receiver processing chain (e.g. demultiplexing, resynchronizing, decoding, rendering). The first and the second transport stream signals may be received from a same radio frequency channel and include a same bitstream (e.g., a same set of TS packets) of an audio/video service. A signal reception quality metric may be monitored for both the first and the second transport stream signals. In case the second transport stream signal is received with a higher signal reception quality metric than the first transport stream signal, it may be decided to switch to the second transport stream signal and to use the single receiver processing chain for processing the same (e.g., bitstream, a same set of TS packets carrying the same) content from the second transport stream signal. The switching may be performed when (e.g., at any time where) there is no valid in the first transport stream signal. Despite the first transport stream signal not being synchronized with the second transport stream signal, the jitter between both may remain limited by the path difference between both tuners, so that there may be a very high probability that there may also be no valid data in the second transport stream signal. For example, the switching may be performed at a point in time between any two (e.g., consecutive) TS packets of the first transport stream signal and may correspond to the same two (e.g., consecutive) TS packets of the second transport stream signal. For example, the two (e.g., consecutive) TS packets (between which the switching may be performed) may belong to a same group of pictures (GOP). Since the switch may be performed between two transport stream signals carrying the same bitstream of the same TS packets, the switching may be performed between any of two TS packets of a same GOP in any of the first and the second transport stream signals without any distortion on the rendered content. Transport stream signals switching between any TS packet of a same GOP may allow to reduce latency for improving the quality (e.g., compared to, for example, switching between two GOPs). Transport stream signals switching between any TS packet of a same GOP may also allow simpler implementation. For example, the switching may be based on only monitoring the presence of valid data on the transport stream interface without recovering the GOP structure. Switching between both transport stream signals as there is no valid data in both of them may ensure no error (e.g., distortion) will be generated by the switching in the rest of the content processing chain (e.g. demultiplexing, resynchronizing, decoding, rendering). The method may allow an efficient and simple implementation of a spatial diversity scheme without requiring duplicating the complete receiver processing chain and without using a dedicated diversity bus.

According to another embodiment, different versions (e.g., bitstreams) of a same content may be transmitted in a same or different radio frequency channels. The different versions may be further transmitted with different levels of error protections. One possible application of such a system may be a transmission of a same content to a variety of heterogeneous receivers including, for example, mobile and fixed receivers. For example, a first version (e.g., bitstream) of the content may be targeted to a fixed receiver and a second version (e.g., bitstream) of the content may be targeted to a mobile receiver (e.g., with a lower resolution). A (e.g., fixed) receiver with multiple tuners but a single receiver chain may also implement the method disclosed herein for improving the overall quality of experience. A single antenna may be used and connected to the multiple tuners. A first transport stream signal (including the first version of the content) may be received by a first tuner, and the first version of the content may be processed by the single receiver processing chain for being rendered by the receiver (or a renderer coupled to the receiver). A second transport stream signal (including the second version of the content) may be received by a second tuner but not further processed by the rest of the receiver processing chain (e.g. demultiplexing, resynchronizing, decoding, rendering). The first and the second transport stream signals may be received from a same or different radio frequency channels. A signal reception quality metric may be monitored for both the first and the second transport stream signals according to any of the above variants. When the second transport stream signal is received with a higher signal reception quality metric than the first transport stream signal, it may be decided to switch to the second transport stream signal and to use the single receiver chain for processing the second version of the same content (from the second transport stream signal). The switching may be performed when there is no valid data in the first transport stream signal. For example, the switching may be performed between two TS packets of different GOPs (e.g., so that after the switching the second transport stream signal may start a new GOP). Switching between both transport stream signals as there is no valid data in both of them may ensure no error will be generated by the switching in the rest of the content processing chain (e.g. demultiplexing, resynchronizing, decoding, rendering). Despite the second version of the content being of lower quality (e.g., resolution) than the first version of the content, rendering a content of a lower resolution without errors may remain preferable to render a content of a higher resolution with many errors/defects. The method may allow an efficient implementation of an adaptive content switching scheme without requiring duplicating the complete receiver processing chain.

According to any of the previous embodiments, despite the first transport stream signal not being synchronized with the second transport stream signal, the jitter between both may remain limited so that when there is no valid data on the first transport stream signal, there may be a very high probability that there may also be no valid data in the second transport stream signal, so that it may be sufficient to perform the switch (from the first transport stream signal to the second transport stream signal) based on the absence of valid data on the first transport stream signal only. Accordingly, in a first variant, the first transport stream signal may be switched to the second transport stream signal based on observing no valid data on the first transport stream signal only (considering there is also very likely no valid data on the second transport stream signal). The switch may be performed at any time when no valid data is observed in the first transport stream signal. In another example, the switch may be performed at the beginning of the time period during which no valid data is observed in the first transport stream signal. In yet another example, the switch may be performed at a fixed amount of time (e.g., 20 ns) after the beginning of the time period during which no valid data is observed in the first transport stream signal.

In a second variant, the first transport stream signal may be switched to the second transport stream signal based on observing no valid data on both the first and the second transport stream signals. In other words, both the first and the second transport stream signals may be monitored to determine when there is no valid data on both of them, to perform the switch in a time period during which there is no valid data in both the first and the second transport stream signals.

Figure 3:
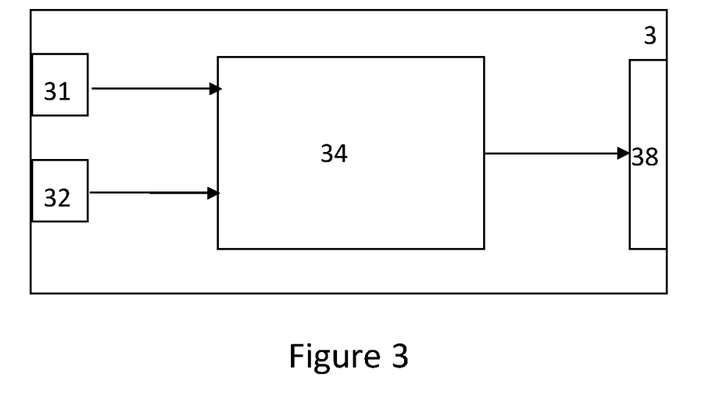
FIG. 3 illustrates an exemplary processing device for switching from a first transport stream signal to a second transport stream signal carrying a same content according to an embodiment.

FIG. 3 illustrates an example of a processing device 3 for switching from a first transport stream signal to a second transport stream signal comprising a same content. The processing device 3 may comprise at least a first tuner 31 for receiving a first transport stream, and a second tuner 32 for receiving a second transport stream. Both the first and the second transport streams may include a (e.g., same bitstream of a) same content. The first 31 and the second 32 tuners may include a radio frequency circuitry configured to isolate a particular radio frequency band and to convert the radio frequency signal of the isolated band into a digital baseband signal. The first 31 and the second 32 tuners may include a digital circuit (e.g., a demodulator) configured to demodulate the baseband signal into respectively a first and a second transport stream signals. According to embodiments, the first 31 and the second 32 tuners may be capable of receiving transport streams from a set of networks belonging to a set comprising:
  a broadcast satellite network;
  a broadcast cable network;
  a broadcast terrestrial network;
  a broadband (e.g., Internet Protocol) network.

More generally, any tuner compatible with any network allowing to deliver a transport stream may be compatible with the embodiments disclosed herein.

According to embodiments, the first 31 and the second 32 tuners may be coupled to a processing module 34, configured to process (e.g., demultiplex, resynchronize, decode, render) a content included in a transport stream signal outputted by the first 31 or the second 32 tuner. The first 31 and the second 32 tuners may be coupled to the processing module 34 via a switching means. The switching means may be any kind of switch circuit. The switching means (e.g., the switch circuit) may be included in the processing module 34 or may be a separate circuit (not represented), connected to the processing module 34. The processing module 34, processing a first transport stream signal (e.g., outputted by the first 31 tuner), and/or the switching means, may be configured to switch from the first transport stream signal to the second transport stream signal (e.g., outputted by the second 32 tuner), on a condition that the second transport stream signal has a higher signal reception quality metric than the first transport stream signal. The processing module 34 (and/or the switching means) may be configured to perform the switching (e.g., between two transport stream packets of a same GOP) when there is no valid data in the first transport stream signal. The processing module 34 may be further configured to process (e.g., demultiplex, resynchronize, decode, render) the same (e.g., bitstream of the same) content as before the switch, from the second transport stream signal.

According to embodiments, the content processed by the processing module 34 may be sent to an output 38 such as a rendering means. According to a particular embodiment the rendering means may be external to the processing device 3 and the output 38 may send the data to render to an external rendering means. According to embodiments, the rendering means, internal or external, belongs to a set comprising:
  a personal computer screen with or without loudspeakers;
  a TV screen with or without loudspeakers;
  a tablet with or without loudspeakers;
  a smartphone screen with or without loudspeakers;
  a head mounted device (HMD) with or without loudspeakers
  smart glasses with or without loudspeakers;
  one or several loudspeakers.

More generally any rendering means allowing to render (e.g., display video and/or play out audio) a decoded content is compatible with the embodiments disclosed herein.

Figure 4:
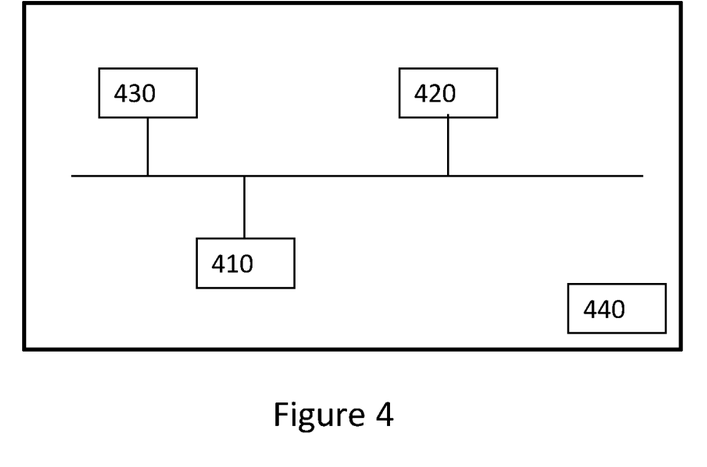
FIG. 4 represents an exemplary architecture of the processing device of FIG. 3 according to an embodiment.

FIG. 4 represents an exemplary architecture of the processing device of FIG. 3 according to an embodiment. The processing device comprises one or more processor(s) 410, which is(are), for example, a CPU, a GPU and/or a DSP (English acronym of Digital Signal Processor), along with internal memory 420 (e.g. RAM, ROM, EPROM, EMMC). The processing device comprises one or several Input/Output interface(s) 430 adapted to send output information and/or to allow a user to enter commands and/or data (e.g. a keyboard, a mouse, a touchpad, a webcam, a display), and/or to send/receive data over a network interface; and a power source 440 which may be external to the processing device.

According to an exemplary and non-limiting embodiment, the processing device further comprises a computer program stored in the memory 420. The computer program comprises instructions which, when executed by the processing device, in particular by the processor(s) 410, make the processing device carrying out the processing method described with reference to FIG. 1. According to a variant, the computer program is stored externally to the processing device on a non-transitory digital data support, e.g. on an external storage medium such as a SD Card, HDD, CD-ROM, DVD, a read-only and/or DVD drive and/or a DVD Read/Write drive, all known in the art. The processing device thus comprises an interface to read the computer program. Further, the processing device could access one or more Universal Serial Bus (USB)-type storage devices (e.g., "memory sticks.") through corresponding USB ports (not shown).

According to embodiments, the processing device is a device, which may belong to a set comprising:
 a set-top-box;
 a TV set;
 a game console;
 a media player;
 a head mounted device;
 smart glasses;
 a smart phone;
 a tablet;
 a phablet;
 an internet gateway;
 a laptop computer;
 a desktop computer;
 a networking device.

According to an embodiment, a method for switching from a first transport stream to a second transport stream is disclosed. The first and the second transport streams comprise a bitstream of a same content. The method comprises switching from the first transport stream to the second transport stream on a condition that the second transport stream has a higher quality metric than the first transport stream, wherein the switching is performed between two transport stream packets of a same group of picture when there is no valid data in the first transport stream In a variant, the first and the second transport streams are received from two different tuners.

In another variant, the two different tuners are connected to two different antennas.

In yet another variant, the quality metric comprises at least one of a signal to noise ratio, SNR, a received signal strength indicator, RSSI, a bit error rate, BER, a packet error rate, PER, and a modulation error rate, MER.

In yet another variant, the first transport stream comprises a TS-VALID signal, and there is no valid data in the first transport stream when the TS-VALID signal is at a low value.

In yet another variant, the first and the second transport stream are received from a same radio frequency channel.

In yet another variant, the first and the second transport stream are received from two different radio frequency channels.

According to another embodiment, an apparatus is also disclosed. The apparatus comprises:
 receiving means for receiving a first and a second transport stream comprising a same bitstream of a same content;
 switching means for switching from the first transport stream to the second transport stream on a condition that the second transport stream has a higher quality metric than the first transport stream, wherein the switching means are configured to switch between two transport stream packets of a same group of picture when there is no valid data in the first transport stream.

According to another embodiment, an apparatus is also disclosed. The apparatus comprises:
 a first tuner for receiving a first second transport stream
 a second tuner for receiving a second transport stream comprising a same bitstream of a same content as the first transport stream;
 a switch for switching from the first transport stream to the second transport stream on a condition that the second transport stream has a higher quality metric than the first transport stream, wherein the switch is configured to switch between two transport stream packets of a same group of picture when there is no valid data in the first transport stream.

In another aspect, a computer program product for switching from a first transport stream to a second transport stream is also disclosed. The computer program product comprises program code instructions executable by a processor for performing the method implemented in any of its variants.

While not explicitly described, the present embodiments may be employed in any combination or sub-combination. For example, the present embodiments are not limited to the described variants, and any arrangement of variants and embodiments can be used. Moreover, the present embodiments are not limited to the described transport stream signal formats and any other type of transport stream formats is compatible with the present embodiments. The present embodiments are not further limited to the described networks/tuners and any and are applicable to any other types of networks/tuner capable of delivering/receiving transport streams.

Besides, any characteristic, variant or embodiment described for a method is compatible with an apparatus comprising means for processing the disclosed method, with a device comprising a processor configured to process the disclosed method, with a computer program product comprising program code instructions and with a non-transitory computer-readable storage medium storing program instructions.

The invention claimed is:

1. A method comprising
 switching from a first transport stream to a second transport stream,
 wherein the first transport stream comprises a signal indicating whether there are valid data in the first transport stream,
 wherein the first and the second transport streams comprise a same bitstream of a same content, and
 wherein the switching is performed between two transport stream packets of a same group of pictures on condition that the second transport stream has a higher quality metric than the first transport stream, and on condition that the signal indicates that there is no valid data in the first transport stream.

2. The method according to claim 1, wherein the first and the second transport streams are received from two different tuners.

3. The method according to claim 2, wherein the two different tuners are connected to two different antennas.

4. The method according to claim 1, wherein the quality metric comprises at least one of a signal to noise ratio (SNR), a received signal strength indicator (RSSI), a bit error rate (BER), a packet error rate (PER), and a modulation error rate (MER).

5. The method according to claim 1, wherein the signal indicates that there is no valid data in the first transport stream when the signal is at a low value.

6. The method according to claim 1, wherein the first and the second transport streams are received from a same radio frequency channel.

7. The method according to claim 1, wherein the first and the second transport streams are received from two different radio frequency channels.

8. A computer storage medium comprising program code instructions executable by a processor for performing the method according to claim 1.

9. An apparatus comprising:
 a receiver configured to receive a first and a second transport streams comprising a same bitstream of a same content; and
 a switch configured to switch from the first transport stream to the second transport stream, wherein the first transport stream comprises a signal indicating whether there are valid data in the first transport stream, and wherein the switching is performed between two transport stream packets of a same group of pictures on condition that the second transport stream has a higher quality metric than the first transport stream, and on condition that the signal indicates that there is no valid data in the first transport stream.

10. The apparatus according to claim 9, wherein the receiver comprises two different tuners configured to receive the first and the second transport streams.

11. The apparatus according to claim 10, wherein the receiver further comprises two different antennas connected to the two different tuners.

12. The apparatus according to claim 9, wherein the quality metric comprises at least one of a signal to noise ratio (SNR), a received signal strength indicator (RSSI), a bit error rate (BER), a packet error rate (PER), and a modulation error rate (MER).

13. The apparatus according to claim 9, wherein the signal indicates that there is no valid data in the first transport stream when the signal is at a low value.

14. The apparatus according to claim 9, wherein the first and the second transport streams are received from a same radio frequency channel.

15. The apparatus according to claim 9, wherein the first and the second transport streams are received from two different radio frequency channels.

\* \* \* \* \*